(12) United States Patent
Han et al.

(10) Patent No.: US 11,370,962 B1
(45) Date of Patent: Jun. 28, 2022

(54) METHODS FOR DESIGNING COATED PROPPANT IN LOW VISCOSITY CARRIER FLUID

(71) Applicant: ARAMCO SERVICES COMPANY, Houston, TX (US)

(72) Inventors: Yanhui Han, Houston, TX (US); Mohammed Ali Ibrahim Sayed, Katy, TX (US); Brent Cooper, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/170,125

(22) Filed: Feb. 8, 2021

(51) Int. Cl.
*E21B 43/267* (2006.01)
*C09K 8/80* (2006.01)

(52) U.S. Cl.
CPC ............ *C09K 8/805* (2013.01); *E21B 43/267* (2013.01)

(58) Field of Classification Search
CPC .................................................... E21B 43/267
See application file for complete search history.

(56) References Cited

U.S. PATENT DOCUMENTS

| | | | |
|---|---|---|---|
| 9,315,721 | B2 | 4/2016 | Mahoney et al. |
| 10,442,976 | B1 | 10/2019 | You et al. |
| 10,472,943 | B2 | 11/2019 | Mahoney et al. |
| 2005/0006095 | A1 | 1/2005 | Justus et al. |
| 2005/0089631 | A1 | 4/2005 | Nguyen et al. |
| 2006/0175059 | A1 | 8/2006 | Sinclair et al. |
| 2007/0209794 | A1 | 9/2007 | Kaufman et al. |
| 2008/0011477 | A1 | 1/2008 | Rediger et al. |
| 2012/0048554 | A1 | 3/2012 | Hughes et al. |
| 2018/0327656 | A1 | 11/2018 | Pitchumani et al. |
| 2019/0040728 | A1 | 2/2019 | Nguyen et al. |

FOREIGN PATENT DOCUMENTS

| | | |
|---|---|---|
| CN | 204294863 U | 4/2015 |
| CN | 105176513 A | 12/2015 |
| CN | 106893050 A | 6/2017 |
| CN | 108033710 A | 5/2018 |
| RU | 2375563 C1 | 12/2009 |

OTHER PUBLICATIONS

Boyer, Jeff et al., "Chemically Enhanced Proppant Transport", SPE-170640-MS, Society of Petroleum Engineers, Oct. 2014, pp. 1-18 (18 pages).
Novotny, E.J., "Proppant Transport", SPE 6813, Society of Petroleum Engineers of AIME, Oct. 1977, pp. 1-12 (12 pages).

*Primary Examiner* — William D Hutton, Jr.
*Assistant Examiner* — Avi T Skaist
(74) *Attorney, Agent, or Firm* — Osha Bergman Watanabe & Burton LLP (57) ABSTRACT

A process for designing a coated proppant particle for downhole transportation and placement. A carrier fluid may transport the coated proppant particle downhole. The process may include selecting a proppant particle material and a coating material. The process may also include selecting a target reduction in a settling velocity and determining a diameter of the coating material disposed on the proppant particle material based on the selected proppant particle material and the density of the coating material. The process for designing a coated proppant particle may include selecting a coating material thickness for coating on the proppant particle material and determining a coating material and design for coating on the proppant particle with the coating material thickness based on the selected proppant particle material and thickness of the coating material to achieve the target reduction in settling velocity.

12 Claims, 5 Drawing Sheets

METHODS FOR DESIGNING COATED PROPPANT IN LOW VISCOSITY CARRIER FLUID

BACKGROUND

Slickwater fracturing is a common technique in reservoir stimulation. It provides a significant increase in oil and gas production of unconventional reservoirs, and tight gas sand and shale gas formations. Slickwater fracturing of a formation may be used to create conductive fractures in reservoir formations to enhance well productivity. Slickwater fracturing may inject a fracturing fluid (slickwater) into an oil and gas bearing subterranean formation under high pressure, which results in the creation or growth of fractures within the formation. These fractures serve as conduits for the flow of hydrocarbons trapped within the formation to the wellbore. When injection is ceased, the induced fractures tend to close under the effect of in-situ stresses. Particles/granules conventionally referred to as proppants, may be placed in the fracture to prop the fracture open once injection is ceased. Substantial efforts focus on the design of propped fracturing of subterranean formations to achieve and retain high fracture conductivity.

Pumping of proppants during slickwater fracturing of formations may enhance the hydrocarbon production capabilities of the subterranean formation. To keep fractures open and capable of supporting the flow of hydrocarbons to the wellbore, a carrier fluid, such as slickwater, may deliver proppants to the fractures within the formation and place the proppant material in a target destination in the fracture. The proppant should be light to reach the target area of the fracture, strong to resist closure of the fracture due to formation pressure, and permeable for the flow of the fluids within the formation. When the fracture is allowed to close, it closes onto the proppant and a flow path to the wellbore between the proppant particles remains open.

One critical challenge in pumping proppants is balancing the advantageous properties of the proppants and carrier fluids during proppant transport. For example, while low viscosity carrier fluids, such as slickwater, are traditionally favored in fracturing of unconventional reservoirs, strong proppants are favored in propping open the fracture. However, the stronger a proppant's properties, the heavier the proppant, and the more likely the proppant will prematurely settle in the fracture, particularly in carrier fluids with low viscosity such as slickwater. Alternatively, lighter, smaller proppants remain suspended during transport in carrier fluids, allowing better distribution in further regions of a fracture. Unfortunately, most light material proppants possess relatively low mechanical strength and do not resist the closure pressure induced by depletion during production in the fracture or avoid damage to the proppant pack.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a process for designing a coated proppant particle for downhole transportation and placement in a carrier fluid. The process may include selecting a proppant particle material and a coating material having a density for coating on the proppant particle material. The process may also include selecting a target reduction in a settling velocity for the coated proppant particle. The process may also include determining a diameter of the coating material disposed on the proppant particle material based on the selected proppant particle material and the density of the coating material to achieve the target reduction in settling velocity.

In another aspect, embodiments disclosed herein relate to a process for designing a coated proppant particle for downhole transportation and placement in a carrier fluid, wherein the process may include selecting a proppant particle material and a coating material thickness for coating on the proppant particle material. The process may also include selecting a target reduction in a settling velocity for the coated proppant particle. The process may also include determining a coating material and density for coating on the proppant particle with the coating material thickness based on the selected proppant particle material and the thickness of the coating material to achieve the target reduction in settling velocity.

In another aspect, embodiments disclosed herein relate to a process for designing a coated proppant material for downhole transportation and placement in a carrier fluid, wherein the process may include determining a density of the coated proppant material and a thickness of the coating on the coated proppant material based on the density of the carrier fluid and the radius of the uncoated proppant particle. The process may include the following relationship:

$$\rho_c \leq \frac{\rho_p}{\alpha_r^2 + \alpha_r + 1} + \frac{\alpha_r(\alpha_r + 1)\rho_f}{\alpha_r^2 + \alpha_r + 1}$$

wherein $\rho_c$ is the coating density, $\rho_f$ is the density of the carrier fluid, and wherein $\alpha_r = (r_c/r_p)$, $r_c$ is the radius of the coated proppant particle and $r_p$ is the radius of the uncoated proppant particle.

Other aspects and advantages of the claimed subject matter will be apparent from the following description and the appended claims.

DETAILED DESCRIPTION

Embodiments of the present disclosure are directed to designing a proppant with a low settling velocity in fracturing operations. In particular, proppant coating thickness may be designed using embodiments of the present disclosure based on the coating material and a target reduction in settling velocity. Proppant coating material may be designed using embodiments of the present disclosure based on the coating thickness and a target reduction in settling velocity.

Specifically, embodiments of the present disclosure may include designing a coated proppant wherein the settling velocity of a proppant may be decreased while designing for the mechanical strength and structural integrity that allows for the proppant to resist the closure pressure induced by the depletion during production in the fracture. Thus, embodiments of the present disclosure are directed to a proppant design workflow to guide in choosing the coating material and coating thickness based on the proppant materials, the fracturing fluid properties, the flow regimes, and the settling velocity models in the target fracture.

As mentioned above, one increasingly favorable method of stimulating unconventional reservoirs is slickwater fracturing. Slickwater is a low-viscosity (0.5 to 10 cp) fracturing fluid used to create long, complex fractures that ultimately increase the stimulated reservoir volume (SRV) for enhanced well productivity in unconventional reservoirs, low-permeable, gas-bearing formations, such as tight-gas shale and sand formations, where fracture width is of less concern. In slickwater fracturing operations, water may be combined with a friction reducing agent and introduced into a formation at a high rate to facilitate fracturing the formation. Slickwater fracturing fluid may produce longer, more narrow fractures, and may use lighter weight and significantly lower amounts of proppant than conventional high viscosity fracturing fluids. The water fracturing fluids may require less cleanup than conventional fracturing fluids of higher viscosity. In one or more embodiments using slickwater, the viscosity of the fluids may range from 0.5 to 10 cP. However, it is also envisioned that the present methods also apply for more viscous conventional fracturing fluids such as those of viscosity greater than 10 cP where it is desirable to increase the transport distance of the proppant particles.

In general, hydraulic fracturing treatment methods, including slickwater fracturing, are considered to have several stages. During the first stage a hydraulic fracturing fluid is injected through a wellbore into a subterranean formation at high rates and pressures. Upon reaching a threshold value, the pressure causes the formation strata/rock to crack and fracture. As the injection of fracturing fluid continues, the fractures propagate further into the formation. During a second stage, proppant may be admixed into the fracturing fluid and transported throughout the hydraulic fractures in the fracturing fluid. In this way, proppants may be deposited throughout the induced fracture, as well as natural fractures to mechanically prevent the fracture from closing after the injection, and the pressure supplied stops.

Although slickwater and other low viscosity carrier fluids provide a lower cost option with acceptable conductivity in low-permeability and/or naturally fractured reservoirs, proppant transport in slickwater is a critical challenge facing slickwater and low viscosity fracturing fluid methods to reduce premature settling.

The success of a hydraulic fracturing operation may depend on how effectively the proppant is transported inside the fracture. To effectively transport a proppant, it is desirable to maintain proppant suspension in the fracturing fluid until the proppant reaches a target destination. In other words, reducing the proppant settling velocity may avoid premature settling of the proppant in the fracture. Long propped fracture length and high fracture conductivity both may depend on proppant transport inside the fracture and proppant settling behavior. The target destination of proppants is most often the area of the fracture that needs to remain propped open once the injection and pressure supplied is removed from the fracture. Proppants need to be light and/or small enough to be carried by the fracturing fluid to the target destination and possess enough mechanical strength to be useful in the production stage of the hydraulic operation.

Figure 1:
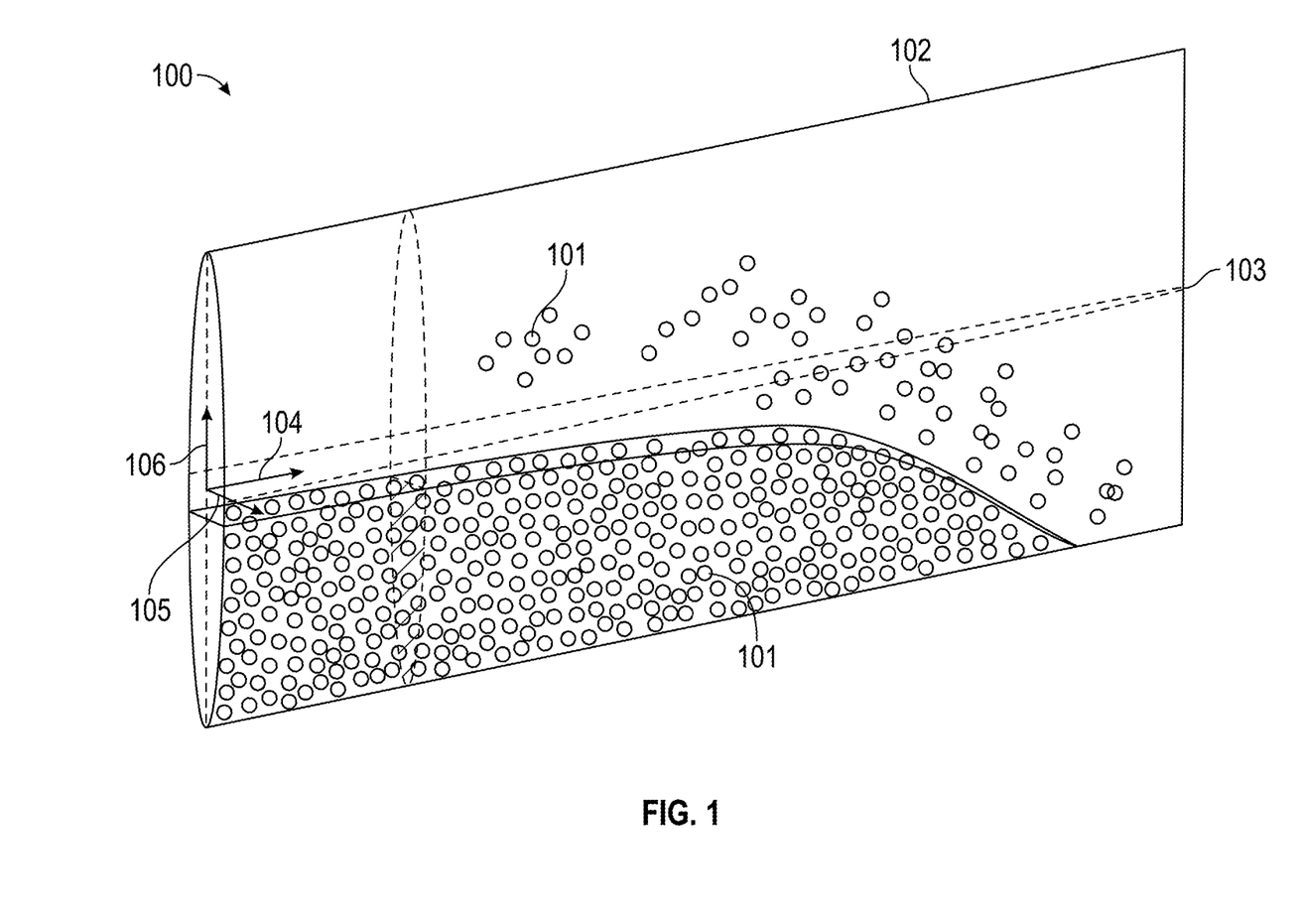
FIG. 1 shows proppant transport in a fracture.

FIG. 1 shows a schematic of a wing fracture 102 illustrating proppant particle settling velocity used in designing the proppant for a fracturing operation. In FIG. 1, the wing fracture 102 is shown with fracture length 104, which extends to fracture tip 103, fracture width 105, and fracture height 106. As shown in simulated fracture system 100 in FIG. 1, proppant particles 101 may prematurely settle and accumulate on the bottom of the wing fracture 102 on their way to the fracture tip 103. The distance that a proppant may be transported by a fracturing fluid may be affected by the flow velocity of the fluid to the fracture tip, the density of the fluid, the viscosity of the fluid, and fracture aperture. In addition to the rheological properties of the carrier fluid and fracture properties, proppant settling velocity also depends on the physical properties of the proppant, such as size, shape, and density of the proppant. Placement of a proppant to a target destination may require maximizing proppant transport velocity to the fracture tip and minimizing proppant settling velocity to the fracture bottom.

In one or more embodiments, the proppant may be designed for carrier fluids having a Reynolds number of less than 2. The following Equation 1 may be used to estimate the settling velocity of a particle ($v_p$) in low Reynolds number flow of Newtonian fluid (Reynolds number <2) where the where $d_p$ is the diameter of the particle, $\rho_p$ is the density of the particle, $\rho_f$ and $\mu$ are the density and viscosity of the carrying (fracturing) fluid, and g is the acceleration of gravity:

$$v_p = \frac{gd_p^2(\rho_p - \rho_f)}{18\mu} \quad \text{(Eq. 1)}$$

As indicated by Equation 1, a large, dense particle will settle very quickly in a low viscosity, low density fracturing fluid, like slickwater. One solution in designing proppants with low settling velocity may be to use small, lightweight proppants. However, proppant particles may also require high mechanical strength to resist a major portion of in-situ stress during the production stage.

Once proppants are transported and deposited to a target location in a fracture, the proppant keeps the fracture open once the pumping pressure is stopped and production stage is commenced. This in-situ pressure may be very high particularly in deep reservoirs during the production stage. The proppant needs a mechanical strength high enough to withstand the force of the fracture environment and keep the fractures open during production operations, as well as high enough to allow the flow of hydrocarbons through the fractures.

Designing proppants that possess low settling velocity and high mechanical strength is a challenging task, particularly in designing a proppant that will effectively remain suspended during transport in low viscosity fracturing fluids, such as slickwater. Small, lightweight, and mechanically strong (uncoated) proppants are not conventionally used or available. Other proppant design considerations include proppant pack hydraulic conductivity and the strength of the proppant pack. The proppant pack should be designed to avoid damaging the formation and damaging the proppants of the proppant pack. It may be understood by those skilled in the art with the benefit of the present disclosure that proppant particle material may be any conventionally and/or commercially available proppant particle appropriate for the fracturing operation. The proppant particles may be chosen from any material suitable for use in hydraulic fracturing applications. As previously described, proppants are propping agent particles used in hydraulic fracturing fluids to maintain and hold open subsurface fractures during or following subsurface treatment. In some embodiments, the proppant particle may comprise particles of materials such as oxides, silicates, sand, ceramic, resin, epoxy, plastic, mineral, glass, or combinations thereof. For instance, the proppant particle may comprise graded sand, treated sand, ceramic proppant, plastic proppant, or other materials. The proppant particle may comprise particles of bauxite, sintered bauxite, $Ti^{4+}$/polymer composites, where the superscript "4+" stands for the oxidation state of titanium, titanium nitride (TiN), or titanium carbide. The proppant particle may comprise glass particles or glass beads. Embodiments of the present disclosure may utilize at least one proppant particle and in embodiments in which more than one proppant particle is used, the proppant particles may contain a mixture of two or more different materials or three or more different materials. Examples of possible proppant particle material includes sands and ceramic materials such as KRYPTOSPHERE®, CARBOHYDROPROP™, and CARBO-LITE™ (all available from Carbo Ceramics Inc.).

The proppant particle may include various sizes or shapes. In some embodiments, the one or more proppant particles may have sizes from 8 mesh to 200 mesh (diameters from 74 micrometers (pm) to 2.36 millimeters (mm)). In some embodiments, the proppant particles may have sizes from 8 mesh to 16 mesh (diam. 2380 pm to 1 180 pm), 16 mesh to 30 mesh (diam. 600 pm to 1 180 pm), 20 mesh to 40 mesh (diam. 420 pm to 840 pm), 30 mesh to 50 mesh (diam. 300 pm to 600 pm), 40 mesh to 70 mesh (diam. 212 pm to 420 pm) or 70 mesh to 140 mesh (diam. 106 pm to 212 pm). The sphericity and roundness of the proppant particles may also vary based on the desired application.

Proppant coatings may be used to modify the properties of a proppant to address the need for a lightweight and strong proppant. While proppant settling velocity may be an important design consideration for transporting the proppant to the target destination, such as the fracture tip, the settling velocity may be irrelevant to the production operation once the proppant reaches the target destination. To design for this temporary consideration of settling velocity, a proppant may be coated with a temporary coating material to lower the settling velocity during proppant transport. The coating material may be composed of lightweight, low density materials, thereby lowing the overall density of the proppant during transportation. The thickness of the coating material should be high enough that the density of the proppant is more than the combined density of the proppant and the coating layer. The proppant may be coated prior to pumping the proppant into the fracture. In some hydrocarbon production operations, once the coated proppant is transported and settled in the target destination, the coating may be removed using conventional chemical and/or thermal treatments. It will be understood to those skilled in the art that removal of the coating layer is a design choice and may not be necessary or preferred in the operation.

Accordingly, embodiments of the present disclosure provide a design procedure to design coated proppants with low settling velocity, thereby providing a proppant that may be transported to the target location in the fracture without prematurely settling, and high mechanical strength. Embodiments of the present disclosure may guide in selecting the proppant particle material, coating material, and coating thickness based on the selected proppant particle, fracturing fluid properties, flow regimes, and settling velocity models in the target destination in the fracture.

Figure 2:
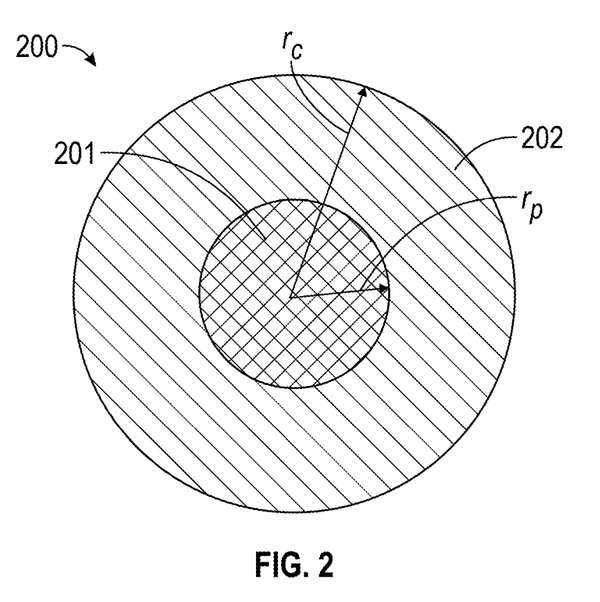
FIG. 2 shows a temporary coated proppant particle.

As shown in FIG. 2, a spherical proppant particle 201 with a radius, $r_p$, is coated with a temporary light weight coating 202. The radius of the coated particle is $r_c$ and the thickness of the coating layer is $(r_c - r_p)$. The density of the coated particle, $\rho_e$, ("equivalent density") may be evaluated with Equation 2.

$$\rho_e = \frac{\frac{4}{3}\pi r_p^3 \cdot \rho_p + \frac{4}{3}\pi (r_c^3 - r_p^3) \cdot \rho_c}{\frac{4}{3}\pi r_c^3} \quad (Eq.2)$$

Wherein $\rho_e$ is the equivalent density of a two-layered spherical proppant particle, such as two-layered spherical proppant particle 200, and $\rho_c$ is the density of the coating layer material, such as temporary light weight coating 202. Equation 3 may be used to simplify Equation 2, to get Equation 4.

$$\alpha_r = \frac{r_c}{r_p} \quad (Eq.~3)$$

$$\rho_e = \frac{\rho_p + (\alpha_r^3 - 1) \cdot \rho_c}{\alpha_r^3} \quad (Eq.~4)$$

According to Equation 1 as applied to Equation 4, the settling velocity of a coated proppant particle, $v_e$, in a fluid may be evaluated with Equation 5.

$$v_e = \frac{g d_c^2 (\rho_e - \rho_f)}{18\mu} \quad (Eq.~5)$$

Where $d_c$ is the diameter of the spherical proppant particle ($2 r_c$), $\rho_f$ is the density of the fluid, and $\mu$ is the viscosity of the fluid. The ratio of the settling velocity of a coated proppant particle, $v_e$, to the settling velocity of the uncoated proppant particle, $v_p$, is shown in Equation 6.

$$\frac{v_e}{v_p} = \alpha_r^2 \frac{(\rho_e - \rho_f)}{(\rho_p - \rho_f)} \quad (Eq.~6)$$

Coating layers disposed on a proppant may be used to lower the proppant particle settling velocity. Proppants with low settling velocity may have a higher potential to reach further in the fracture to the target destination. Embodiments of the present disclosure may help design a coated proppant particle with a lower settling velocity than an uncoated proppant particle, wherein the settling velocity of the coated proppant particle is less than the settling velocity of the proppant without coating. Equation 7 applies this relationship to Equation 6.

$$\alpha_r^2 \frac{(\rho_e - \rho_f)}{(\rho_p - \rho_f)} \leq 1 \quad (Eq.~7)$$

Equation 8 shows Equation 7 in an equivalent form.

$$\alpha_r^2 \leq \frac{(\rho_p - \rho_f)}{(\rho_e - \rho_f)} \quad \text{(Eq. 8)}$$

Substituting the equivalent density, $\rho_e$, Equation 9 shows the relationship between the density of the coating material and the density of the layer thickness.

$$\rho_c \leq \frac{\rho_p}{\alpha_r^2 + \alpha_r + 1} + \frac{\alpha_r(\alpha_r + 1)\rho_f}{\alpha_r^2 + \alpha_r + 1} \quad \text{(Eq. 9)}$$

Figure 3:
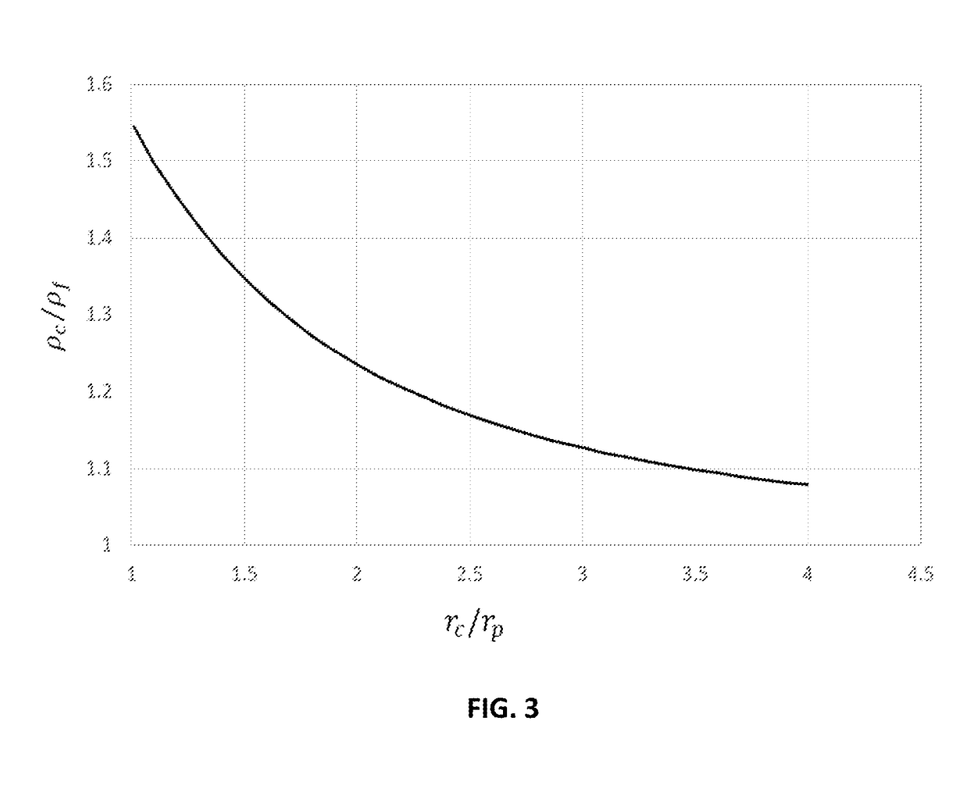
FIG. 3 shows maximum density curve on coated material.

As evaluated in Equation 9, the maximum density of the coating material decreases with the increase of layer thickness. This relationship may be also seen in FIG. 3, wherein the relationship between the ratio of the density of the coating over the density of the fluid ($\rho_c/\rho_f$) and the ratio of the radius of the coated proppant over the uncoated proppant ($r_c/r_p$). The curve in FIG. 3 derives from Equation 9, wherein $\rho_c$ is calculated using Equation 9 and represents the values of the maximum coating material density and coating material thickness wherein the settling velocity of the coated proppant is equal to the settling velocity of the proppant without a coating. More specifically, the curve shown in FIG. 3 provides the critical values of a coating material (if coating thickness is known) and/or coating thickness (if coating material is known) wherein the settling velocity of the coated proppant particle is the same as the settling velocity of the uncoated proppant particle. The values of the density of the coating over the density of the fluid ratio (y-axis "$\rho_c/\rho_f$") and the radius of the coated proppant over the uncoated proppant ratio (x-axis "$r_c/r_p$") that fall under the curve in FIG. 3 will yield a coated proppant particle with a lower settling velocity than that of the uncoated proppant particle.

As shown in FIG. 3, the maximum density of the coating material, $\rho_c$, decreases as the coating thickness increases. For example, if the radius of the proppant particle, $r_p$, is doubled by a coating layer, the maximum specific density (i.e., relative to the density of the fluid) of the coating material, $\rho_c$, is 1.24, which will make the settling velocity of the coated particle, $v_e$, same as the original particle without coating, $v_p$. In other words, for a given coating layer thickness value, the curve on FIG. 3 may provide the coating material density (via y-axis "$\rho_c/\rho_f$") wherein the settling velocity is the same as the proppant without coating. Alternately, for a given coating material density, the curve on FIG. 3 may provide the coating material thickness (via x-axis "$r_c/r_p$") wherein the settling velocity is the same as the proppant without coating. It follows that values of $\rho_c/\rho_f$ and $r_c/r_p$ that fall below the curve in FIG. 3 may decrease a coated proppant setting velocity, thereby increasing proppant placement distance.

In some embodiments of the present disclosure, for a given target distance or target settling velocity, the coating thickness may be selected based on calculations using the above equations when the coating material density is known. In some embodiments of the present disclosure, the coating material density may be selected based on calculations using the above equations when coating thickness is known. FIG. 3 may provide a range of coating material density and/or coating material thickness wherein the settling velocity may be reduced. This range limitation may inform the next step of choosing the coating material or coating material thickness to achieve a reduction in settling velocity.

Figure 4:
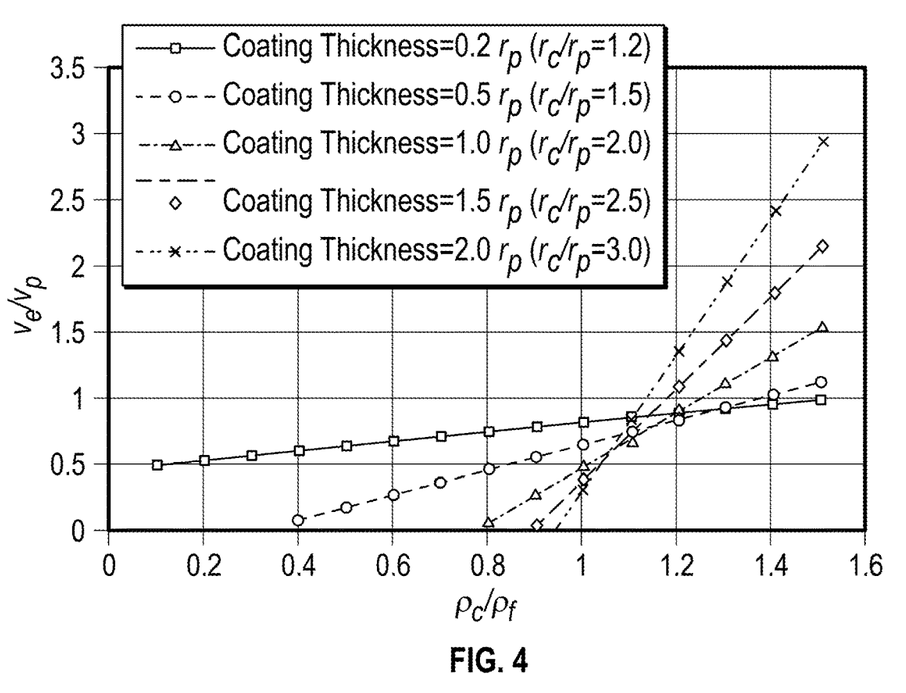
FIG. 4 shows a relationship between the settling velocity and coating material density for proppant particles in Stokes' flow region.

FIG. 4 is an engineering chart derived using equations in the present disclosure (see Equations 1-9). FIG. 4 illustrates how to choose coating material density if the coating thickness is known, or how to choose the coating thickness if the coating material density is known, to achieve a target reduction in proppant settling velocity according to embodiments of the present disclosure. When the coating material density is calculated, the coating material may be a material that possesses the calculated density. Although FIG. 4 shows the lines for thickness-particle ratios of 0.2, 0.5, 1.0, 1.5, and 2.0, it will be understood by those in the art with the benefit of the present disclosure that additional lines may be added for other given thickness-particle ratios.

From FIG. 4, to reduce the settling velocity by 50% of the settling velocity of a proppant without coating ($v_e/v_p$=0.5), the following proppant options may be selected:

Option 1: Known coating thickness is 20% of the particle radius (i.e., $r_c/r_p$=1.2). The specific density of the coating material needs to be around 0.1 (i.e., $\rho_c/\rho_f$=0.1) according to FIG. 4. Extremely light materials, such as poly urethane foam, may be used as a coating material for a reduced settling velocity of 50%.

Option 2: Known coating thickness is 50% of the particle radius (i.e., $r_c/r_p$=1.5) The specific density of the coating material needs to be around 0.8 (i.e., $\rho_c/\rho_f$=0.8) according to FIG. 4. Polymers, such as Poly (4-methyl-1-pentene), Poly (1-pentene), and Ethylene, have density in this range and may be an appropriate coating material. Some plastics, such as Polypropylene PE Uniboard Eco (available from Dotmar Engineering Plastics), also have specific density at around 0.8 and may be used as a coating material.

Option 3: Known coating thickness is same as the particle radius (i.e., $r_c/r_p$=2.0). The specific density of the coating material needs to be around 1.0 (i.e., $\rho_c/\rho_f$=1.0) according to FIG. 4. Many conventional coating materials have density in this range, for example, Acrylonitrile, Polydimethylsiloxane, Poly (vinyl stearate), and Polyethylene POLYSTONE® M Flametech (available from Röchling Engineering Plastics).

Thus, as demonstrated from FIG. 4, once coating density is selected, the appropriate coating material may be selected having such density, such as from the list of species in Table 1-3. Specifically, Table 1 is a list of polymers that may be used for coating proppants according to the embodiments of the present disclosure.

TABLE 1

| Chemical Name | Density (g/cc) |
| --- | --- |
| Poly(4-methyl-1-pentene) | 0.83 |
| Poly(1-pentene) | 0.85 |
| Ethylene/propylene/diene terpolymer-50% ethylene/4% diene | 0.86 |
| Ethylene/propylene copolymer-60% ethylene | 0.86 |
| Poly(1-butene) | 0.86 |
| Poly(1-hexene) | 0.86 |

TABLE 1-continued

| Chemical Name | Density (g/cc) |
| --- | --- |
| Poly(1-octadecene) | 0.86 |
| Polypropylene, atactic | 0.866 |
| Polymethylhexadecylsiloxane | 0.88 |
| Polymethyltetradecylsiloxane | 0.88 |
| Ethylene/butylene copolymer, dihydroxy terminated | 0.88 |
| Ethylene/butylene copolymer, monohydroxyl terminated | 0.88 |
| Poly(vinyl n-decyl ether) | 0.883 |
| Polymethyloctadecylsiloxane | 0.886 |
| Poly(1,4-pentadiene) | 0.89 |
| Poly(methyl n-tetradecyl siloxane) | 0.89 |
| Poly(methyl n-octadecylsiloxane) | 0.89 |
| Poly(vinyl n-dodecyl ether) | 0.892 |
| Poly(1,4-butadiene) | 0.892 |
| Polypropylene, isotactic | 0.9 |
| Polybutadiene, cis | 0.9 |
| Polybutadiene, cis & trans-36% trans | 0.9 |
| Poly(vinyl 2-ethylhexyl ether) | 0.904 |
| Polyisoprene | 0.906 |
| Polybutadiene, dicarboxy terminated | 0.907 |
| Poly(1,2-butadiene) | 0.909 |
| Polymethylhexylsiloxane | 0.91 |
| Styrene/ethylene-butylene, ABA block copolymer-29% styrene | 0.91 |
| Polydimethylsilane | 0.91 |
| Polybutadiene oligomer, acrylated | 0.91 |
| Polymethyloctylsiloxane | 0.91 |
| Poly(methyl n-octylsiloxane) | 0.91 |
| Styrene/butadiene copolymer-5% styrene | 0.91 |
| Poly(methyl n-hexylsiloxane) | 0.91 |
| Poly(vinyl n-octyl ether) | 0.914 |
| Poly(1-butene), isotactic | 0.915 |
| Styrene/isoprene, ABA block copolymer-14% styrene | 0.92 |
| Polyisobutylene | 0.92 |
| Poly(isobutylene-co-isoprene)-2.2% isoprene | 0.92 |
| Polyethylene, low density | 0.92 |
| Poly(vinyl sec-butyl ether) | 0.92 |
| Poly(vinyl isopropyl ether) | 0.924 |
| Poly(butadiene-co-acrylonitrile), dicarboxy terminated-10% acrylonitrile | 0.924 |
| Ethylene/vinyl acetate copolymer-18% vinyl acetate | 0.925 |
| Poly(vinyl n-hexyl ether) | 0.925 |
| Poly(vinyl n-butyl ether) | 0.927 |
| Ethylene/vinyl acetate copolymer-9% vinyl acetate | 0.928 |
| Poly(lauryl methacrylate) | 0.929 |
| Poly(dodecyl methacrylate) | 0.929 |
| Poly(isobutylene-co-isoprene), brominated-1.5% isoprene, 2.1% bromine | 0.93 |
| Polyethylene, oxidized | 0.93 |
| Ethylene/acrylic acid copolymer-5% acrylic acid | 0.93 |
| Ethylene/ethyl acrylate copolymer-18% ethyl acrylate | 0.93 |
| Polybutadiene, phenyl terminated | 0.93 |
| Poly(vinyl isobutyl ether) | 0.93 |
| Ethylene/vinyl acetate copolymer-14% vinyl acetate | 0.932 |
| Styrene/butadiene copolymer-23% styrene | 0.935 |
| Poly(butadiene-co-acrylonitrile), amine terminated-10% acrylonitrile | 0.938 |
| Styrene/butadiene, ABA block copolymer | 0.94 |
| Polydimethylsiloxane, ethoxy terminated | 0.94 |
| Ethylene/vinyl acetate copolymer-25% vinyl acetate | 0.948 |
| Polyethylene, high density | 0.95 |
| Ethylene/methacrylic acid ionomer, sodium ion | 0.95 |
| Poly(p-t-butyl styrene) | 0.95 |
| Poly(vinyl ethyl ether) | 0.95 |
| Poly(vinyl cyclohexane) | 0.95 |
| Ethylene/methacrylic acid ionomer, zinc ion | 0.95 |
| Ethylene/vinyl acetate copolymer-28% vinyl acetate | 0.951 |
| Ethylene/vinyl acetate copolymer-33% vinyl acetate | 0.952 |
| Poly(butadiene-co-acrylonitrile), dicarboxy terminated-18% acrylonitrile | 0.955 |
| N-Vinylpyrrolidone/vinyl acetate copolymer-30% N-vinyl pyrrolidone | 0.955 |
| Poly(butadiene-co-acrylonitrile), amine terminated-16.5% acrylonitrile | 0.956 |
| Poly(butadiene-co-acrylonitrile), dicarboxy terminated-21.5% acrylonitrile | 0.958 |
| Polyisoprene, trans | 0.96 |
| Poly(butadiene-co-acrylonitrile), dicarboxy terminated-26% acrylonitrile | 0.96 |
| Poly(methyl vinyl ether/maleic acid), monobutyl ester | 0.962 |
| Styrene/butadiene copolymer-45% styrene | 0.965 |
| Octadecene-1-maleic anhydride copolymer-20% maleic anhydride | 0.97 |
| Acrylonitrile/butadiene copolymer-22% acrylonitrile | 0.97 |
| Acrylonitrile/butadiene copolymer-21% acrylonitrile | 0.97 |
| Acrylonitrile/butadiene copolymer-29% acrylonitrile | 0.97 |
| Polydimethylsiloxane | 0.97 |
| Poly(n-octyl methacrylate) | 0.971 |
| Poly(tetramethylene ether) glycol | 0.979 |

TABLE 1-continued

| Chemical Name | Density (g/cc) |
|---|---|
| Ethylene/vinyl acetate copolymer-40% vinyl acetate | 0.98 |
| Ethylene/vinyl acetate copolymer-45% vinyl acetate | 0.98 |
| Polydimethylsiloxane, dihydroxy terminated | 0.98 |
| Polydimethylsiloxane, dimethylamine terminated | 0.98 |
| Polydimethylsiloxane, acetoxy terminated | 0.98 |
| Poly(propylene oxide), monoamine terminated | 0.98 |
| Acrylonitrile/butadiene copolymer-33% acrylonitrile | 0.98 |
| Poly(vinyl n-butyl sulfide) | 0.98 |
| Poly(vinylmethylsiloxane) | 0.98 |
| Polyoxytetramethylene | 0.98 |
| Poly(butadiene-co-acrylonitrile), vinyl terminated-16% acrylonitrile | 0.985 |
| Acrylonitrile/butadiene copolymer-38% acrylonitrile | 0.99 |
| Acrylonitrile/butadiene copolymer-27% acrylonitrile | 0.99 |
| Acrylonitrile/butadiene copolymer-45% acrylonitrile | 0.99 |
| Ethylene/vinyl acetate copolymer-50% vinyl acetate | 0.99 |
| Acrylonitrile/butadiene copolymer-31% acrylonitrile | 0.99 |
| Acrylonitrile/butadiene copolymer-44% acrylonitrile | 0.99 |
| Polymethylhydrosiloxane | 0.99 |
| Poly(1,2,2-trimethylpropyl methacrylate) | 0.991 |
| Poly(neopentyl methacrylate) | 0.993 |
| Poly(propylene oxide), diamine terminated | 0.9964 |
| Poly(propylene oxide), diurea terminated | 0.9989 |
| Poly(vinyl stearate) | 1 |
| Polydimethylsiloxane, chlorine terminated | 1 |
| Acrylonitrile/butadiene copolymer-43% acrylonitrile | 1 |
| Acrylonitrile/butadiene copolymer-51% acrylonitrile | 1 |
| Acrylonitrile/butadiene copolymer-41% acrylonitrile | 1 |
| Poly(propylene oxide) | 1 |
| Poly(t-butyl acrylate) | 1 |
| Poly(3,3-dimethylbutyl methacrylate) | 1.001 |
| Poly(propylene oxide), triamine terminated | 1.003 |
| Poly(propylene glycol) | 1.005 |
| Poly(1,3-dimethylbutyl methacrylate) | 1.005 |
| Poly(n-hexyl methacrylate) | 1.007 |
| Poly(dimethylsiloxane-co-ethylene oxide), AB block-25% dimethylsiloxane | 1.007 |
| Nylon 12 [Poly(lauryllactam)] | 1.01 |
| Poly(1-methylpentyl methacrylate) | 1.013 |
| Poly(1,4-butylene adipate) | 1.019 |
| Poly(vinyl propionate) | 1.02 |
| Poly(t-butyl methacrylate) | 1.022 |
| Poly(o-methyl styrene) | 1.027 |
| Poly(1-methylbutyl methacrylate) | 1.03 |
| Poly(isopentyl methacrylate) | 1.032 |
| Poly(n,n-dimethyl-3,5-dimethylene piperidinium chloride) | 1.033 |
| Poly(isopropyl methacrylate) | 1.033 |
| Poly(4-methylstyrene), monocarboxy terminated | 1.04 |
| Poly(4-methylstyrene) | 1.04 |
| Nylon 11 [Poly(undecanoamide)] | 1.04 |
| Poly(2-ethylbutyl methacrylate) | 1.04 |
| Poly(vinyl n-pentyl ether) | 1.041 |
| Poly(isobutyl methacrylate) | 1.045 |
| Poly(dimethysiloxane-co-diphenylsiloxane)-80% dimethylsiloxane | 1.05 |
| Polystyrene, monomethacrylate terminated | 1.05 |
| Polystyrene, monohydroxy terminated | 1.05 |
| Poly(vinyl methyl ether) | 1.05 |
| Polystyrene, 90% syndiotactic | 1.05 |
| Polystyrene | 1.05 |
| Poly(5-phenyl-1-pentene) | 1.05 |
| Poly(sec-butyl methacrylate) | 1.052 |
| Poly(n-butyl methacrylate) | 1.055 |
| Polyethyleneimine, epichlorohydrin modified | 1.055 |
| Polydiethoxysiloxane | 1.06 |
| Ethylene/vinyl acetate copolymer-70% vinyl acetate | 1.06 |
| Poly(2,6-dimethyl-p-phenylene oxide) | 1.06 |
| Poly(isobutyl acrylate) | 1.06 |
| Poly(isobornyl methacrylate) | 1.06 |
| Polyphenylene oxide | 1.06 |
| Poly(dimethylsiloxane-co-ethylene oxide), AB block-18% dimethylsiloxane | 1.066 |
| Poly(dimethylamine-co-epichlorohydrin), quaternized | 1.07 |
| Nylon 6/12 [Poly(hexamethylene dodecanediamide)] | 1.07 |
| Poly(diethylene triamine-co-adipic acid) | 1.07 |
| Polyethyleneimine | 1.07 |
| Poly(caprolatone)diol | 1.07 |
| Poly(caprolatone)triol | 1.073 |
| Poly(alpha-methylstyrene) | 1.075 |
| Nylon 6/9 [Poly(hexamethylene nonanediamide)] | 1.08 |
| Poly(ethylene oxide), diamine terminated | 1.08 |
| Poly(isopropyl acrylate) | 1.08 |

TABLE 1-continued

| Chemical Name | Density (g/cc) |
|---|---|
| Polyethyleneimine, 80% ethoxylated | 1.08 |
| Poly(n-propyl methacrylate) | 1.08 |
| Styrene/acrylonitrile copolymer-25% acrylonitrile | 1.08 |
| Nylon 6/10 [Poly(hexamethylene sebacamide)] | 1.08 |
| Nylon 6/6 [Poly(hexamethylene adipamide)] | 1.08 |
| Styrene/allyl alcohol copolymer-6% hydroxyl | 1.083 |
| Poly(vinyl butyral)-11% hydroxyl content | 1.083 |
| Poly(vinyl butyral) | 1.083 |
| Poly[2,2-propane bis[4-(2,6-dimethylphenyl)]carbonate] | 1.083 |
| Poly(ethylene sebacate) | 1.085 |
| Poly(n-butyl acrylate) | 1.087 |
| Butyl methacrylate/isobutyl methacrylate copolymer-50/50 copolymer | 1.09 |
| Poly(methyl m-chlorophenylethylsiloxane) | 1.09 |
| Poly(alpha,alpha-dimethylpropiolactone) | 1.097 |
| Poly(ethylene glycol mono-methyl ether) | 1.097 |
| Polystyrene sulfonic acid | 1.1 |
| Polyethylene, chlorinated-25% chlorine | 1.1 |
| Polysulfone, anionic | 1.1 |
| Polymethacrylonitrile | 1.1 |
| Poly(cyclohexyl methacrylate) | 1.1 |
| Poly(methyl m-chlorophenylsiloxane) | 1.1 |
| Poly(vinyl butyral)-19% hydroxyl content | 1.1 |
| Poly(ethyl methacrylate) | 1.11 |
| Polymethylphenylsiloxane | 1.11 |
| Poly(methylphenylsiloxane) | 1.11 |
| Poly(acryloxypropylmethylsilane) | 1.11 |
| Poly(p-cyclohexylphenyl methacrylate) | 1.115 |
| Vinyl alcohol/vinyl butyral copolymer-80% vinyl butyral | 1.12 |
| Nylon 6(3)T [Poly(trimethyl hexamethylene terephthalamide)] | 1.12 |
| Poly(vinyl methyl ketone) | 1.12 |
| Nylon 6 [Poly(caprolactam)] | 1.12 |
| Poly(ethyl acrylate) | 1.12 |
| Poly(2,2,2'-trimethylhexamethylene terephthalamide) | 1.12 |
| Poly(1-phenylethyl methacrylate) | 1.129 |
| Poly(2-ethyl-2-oxazoline) | 1.14 |
| Ethyl cellulose | 1.14 |
| Poly(2,6-diphenyl-1,4-phenylene oxide) | 1.14 |
| Polycaprolactone | 1.143 |
| Poly(1,2-diphenylethyl methacrylate) | 1.147 |
| Poly(t-butylaminoethyl methacrylate) | 1.15 |
| Poly(2-hydroxyethyl methacrylate) | 1.15 |
| Poly(styrene oxide) | 1.15 |
| Polyethylene, chlorinated-36% chlorine | 1.16 |
| Poly(diphenylmethyl methacrylate) | 1.168 |
| Poly(ethylene succinate) | 1.175 |
| Poly(benzyl methacrylate) | 1.179 |
| Styrene/maleic anhydride copolymer-75% styrene | 1.18 |
| Phenoxy resin | 1.18 |
| Poly(vinyl methyl sulfide) | 1.18 |
| Poly(methacrylic acid), sodium salt | 1.18 |
| Poly(ethylene adipate) | 1.183 |
| Poly(ethylene azelate) | 1.183 |
| Polyacrylonitrile | 1.184 |
| Poly(vinyl acetate) | 1.19 |
| Poly(1,4-cyclohexylidene dimethylene terephthalate) | 1.196 |
| Polydiphenoxyphosphazene | 1.2 |
| Poly(methyl methacrylate) | 1.2 |
| Poly(n-vinyl carbazole) | 1.2 |
| Polycarbonate | 1.2 |
| Bisphenol A polycarbonate | 1.2 |
| Poly[1,1-(1-phenylethane) bis(4-phenyl)carbonate] | 1.2 |

Table 2 is a list of plastics that may be used to coat the proppant according to embodiments of the present disclosure.

TABLE 2

| Material | g/cm3, density |
|---|---|
| Polyvinyl chloride TROVIDUR ® EN (available from Röchling Industrial) | 1.47 |
| KETRON ® PEEK HPV (available from Mitsubishi Chemical Advanced Materials) g/cm3 | 1.45 |
| PAI TORLON ® 4301 & 4501 (available from Solvay) g/cm3 | 1.45 |
| ERTALYTE ® TX PET-P (available from Mitsubishi Chemical Advanced Materials) g/cm3 | 1.44 |

TABLE 2-continued

| Material | g/cm3, density |
|---|---|
| TECHTRON ® HPV PPS (available from Mitsubishi Chemical Advanced Materials) g/cm3 | 1.43 |
| Acetal Ertacetal C (available from AZO Materials) g/cm3 | 1.41 |
| PAI TORLON ® 4203 & 4503 (available from Sterling Plastics) g/cm3 | 1.41 |
| KETRON ® PEEK CA30 (available from Mitsubishi Chemical Advanced Materials) g/cm3 | 1.4 |
| ERTALYTE ® PET-P (available from Mitsubishi Chemical Advanced Materials) g/cm3 | 1.39 |
| KETRON ® PEEK 1000 (available from Mitsubishi Chemical Advanced Materials) g/cm3 | 1.31 |
| CELAZOLE ® PBI (available from PBI Performance Products, Inc.) g/cm3 | 1.3 |
| ORKOT ® TLM Marine (available from Trelleborg Sealing Solutions) g/cm3 | 1.3 |
| ORKOT ® TXM Marine (available from Trelleborg Sealing Solutions) g/cm3 | 1.3 |
| PPSU 1000 g/cm3 | 1.29 |
| Nylon ERTALON ® (available from Mitsubishi Chemical Advanced Materials) 66-GF30 g/cm3 | 1.29 |
| Polyetherimide PEI 1000 g/cm3 | 1.27 |
| ORKOT ® C320 (TLG) (available from Trelleborg Sealing Solutions) g/cm3 | 1.25 |
| ORKOT ® C321 (TL) (available from Trelleborg Sealing Solutions) g/cm3 | 1.25 |
| Polysulphone PSU 1000 g/cm3 | 1.24 |
| Polycarbonate Safeguard UVX (available from AZO Materials) g/cm3 | 1.2 |
| Nylon ERTALON ® (available from Mitsubishi Chemical Advanced Materials) 4.6 g/cm3 | 1.18 |
| Nylon NYLATRON ® GSM (available from Mitsubishi Chemical Advanced Materials) g/cm3 | 1.16 |
| Nylon ERTALON ® 6PLA (available from Mitsubishi Chemical Advanced Materials) g/cm3 | 1.15 |
| Nylon ERTALON ® 6XAU (available from Mitsubishi Chemical Advanced Materials) g/cm3 | 1.15 |
| Nylon ERTALON ® PA99 ERAS (available from Mitsubishi Chemical Advanced Materials) g/cm3 | 1.15 |
| Nylon NYLATRON ® GS (available from Mitsubishi Chemical Advanced Materials) g/cm3 | 1.15 |
| Nylon NYLATRON ® MC901 (available from Mitsubishi Chemical Advanced Materials) g/cm3 | 1.15 |
| Nylon ERTALON ® 6SA (available from Mitsubishi Chemical Advanced Materials) g/cm3 | 1.14 |
| Nylon ERTALON ® 66SA (available from Mitsubishi Chemical Advanced Materials) g/cm3 | 1.14 |
| Nylon ERTALON ® LFX (available from Mitsubishi Chemical Advanced Materials) g/cm3 | 1.14 |
| Nylon NYLATRON ® 703XL (available from Mitsubishi Chemical Advanced Materials) g/cm3 | 1.11 |
| Polyethylene POLYSTONE ® M Flametech (available from Röchling Engineering Plastics) g/cm3 | 0.98 |
| Polyethylene PE NUVEX ® Playboard (available from Dotmar Engineering Plastics) g/cm3 | 0.97 |
| Polyethylene PE NUVEX ® Leisureboard (available from Dotmar Engineering Plastics) g/cm3 | 0.97 |
| Polyethylene PE NUVEX ® Saniboard (available from Dotmar Engineering Plastics) g/cm3 | 0.97 |
| Polyethylene POLYSTONE ® Ezyslide (available from Dotmar Engineering Plastics) g/cm3 | 0.96 |
| Polyethylene POLYSTONE ® P8000+ (available from Dotmar Engineering Plastics) g/cm3 | 0.96 |
| Polyethylene POLYSTONE ® P500 (available from Dotmar Engineering Plastics) g/cm3 | 0.95 |
| Polyethylene POLYSTONE ® P300 (available from Dotmar Engineering Plastics) g/cm3 | 0.95 |
| Polyethylene POLYSTONE ® Cutrite (available from Röchling Engineering Plastics) g/cm3 | 0.95 |
| Polyethylene POLYSTONE ® M-Slide (available from Röchling Engineering Plastics) g/cm3 | 0.95 |
| Polyethylene POLYSTONE ® Fender (available from Dotmar Engineering Plastics) g/cm3 | 0.95 |
| Polyethylene PE NUVEX ® Boatboard (available from Dotmar Engineering Plastics) g/cm3 | 0.95 |
| Polyethylene POLYSTONE ® P7000 (available from Dotmar Engineering Plastics) g/cm3 | 0.93 |
| Polyethylene POLYSTONE ® Ultra (available from Dotmar Engineering Plastics) g/cm3 | 0.93 |
| Polyethylene POLYSTONE ® Matrox ® (available from Röchling Engineering Plastics) g/cm3 | 0.93 |
| Polypropylene POLYSTONE ® PPH (available from Röchling Engineering Plastics) g/cm3 | 0.92 |
| Polyethylene PE Uniboard Eco (available from Dotmar Engineering Plastics) g/cm3 | 0.75 |
| Polypropylene Uniboard Standard (available from Dotmar Engineering Plastics) g/cm3 | 0.65 |

Table 3 is a list of other conventional solid material that may be used to coat the proppant.

TABLE 3

| Solid | Density g/cc |
|---|---|
| BS - copolymer of acrylonitrile, butadiene and styrene | 1.06 |
| Acrylic | 1.19 |
| Alum, lumpy | 0.881 |
| Alum, pulverized | 0.752 |
| Amber | 1.06-1.1 |
| Asphalt, crushed | 0.72 |
| Bakelite | 1.36 |
| Bark, wood refuse | 0.24 |
| Bauxite, crushed | 1.28 |
| Beeswax | 0.96 |
| Borax, fine | 0.85 |
| Caoutchouc | 0.9-1 |
| Cellulose acetat, moulded | 1.22-1.34 |
| Cellulose acetat, sheet | 1.28-1.32 |
| Cellulose nitrate, celluloid | 1.35-1.4 |
| Chlorinated polyether | 1.4 |
| Coal, bituminous | 1.2-1.5 |
| Coke | 1-1.7 |

TABLE 3-continued

| Solid | Density g/cc |
|---|---|
| Concrete, lightweight | 0.45-1.0 |
| Copal | 1-1.15 |
| Cork | 0.2-0.25 |
| Cork, linoleum | 0.55 |
| Ebonite | 1.15 |
| Epoxy cast resin | 1.11-1.4 |
| Epoxy glass fibre | 1.5 |
| Gamboge | 1.2 |
| Gum arabic | 1.3-1.4 |
| Hardboard | 1 |
| Lime, slaked | 1.35 |
| Linoleum | 1.2 |
| Lithium | 0.53 |
| Nylon 6 | 1.12-1.17 |
| Nylon 6,6 | 1.13-1.15 |
| Oak | 0.72 |
| Paraffin | 0.9 |
| Phenolic cast resin | 1.24-1.32 |
| Plywood | 0.54 |
| Polyacrylonitrile | 1.16-1.18 |
| Polyamides | 1.15-1.25 |
| PC - poly carbonate | 1.2 |
| PBT - poly butylene terephthalate | 1.35 |

TABLE 3-continued

| Solid | Density g/cc |
| --- | --- |
| LDPE - low density poly ethylene | 0.91 |
| HDPE - (PEH) - high density poly ethylene | 0.96 |
| PET - poly ethylene terephthalate | 1.35 |
| PMMA - poly methyl methacrylate | 1.2 |
| POM - poly oxy methylene | 1.4 |
| PP - poly propylene | 0.91-0.94 |
| PPO - poly penylene ether | 1.1 |
| PS - poly styrene | 1.03 |
| PU - poly urethane foam | 0.03 |
| PVDF - poly vinylidene fluoride | 1.76 |
| PVC - poly vinyl chloride | 1.39-1.42 |
| Resin | 1.07 |
| Rosin | 1.07 |
| Rubber, hard | 1.2 |
| Rubber, soft commercial | 1.1 |
| Rubber, pure gum | 0.91-0.93 |

Embodiments of the present disclosure may use conventional resins to coat proppants, such as epoxy, furan, phenolic resins, resole-modified Novolac resins, and combinations thereof.

Embodiments of the present disclosure may guide the design of the removal of temporary coating on proppant particles. Once in place in the target destination in the fracture, there may no longer be a need for a coating on the proppant. In these embodiments, the proppant coating may be removed using conventional methods, such as breakers. Examples of a breaker include an acid, an oxidizer, an enzyme breaker, a chelating agent, or a combination thereof. Examples of a breaker may also include, but are not be limited to, sodium bromate, potassium bromate, sodium persulfate, ammonium persulfate, potassium persulfate, and various peroxides. The breaker may initiate the breakage of the polymer coating when the entirety of the proppant settles in the fracture.

In embodiments of the present disclosure, the breaker may be designed to be incorporated with the polymer coating, the ceramic proppant, or may be part of the main fracturing fluid that carries the proppant and places it into the fracture. The breaker may be pumped after the fracturing treatment concludes as a post-flush to break down the coating after proppant placement.

Embodiments of the present disclosure may include the following: a breaker to break down the coating after the setting of the proppant inside the fracture; an enforcing agent such as nano particles, nano tubes, and/or fibers to increase the strength of the coated proppant; an electromagnetic, electrical, or any other physical property to enable the detection of the fracture propagation and/or fracture mapping; wettability alteration agent to improve the relative permeability to gas and oil and allow higher production rates including surfactants, polymers, fluoro-surfactant, fluoropolymers, nano-particles, surface modified nano-particles or a combination of any of the above; scale inhibitors, wax inhibitor, scale dissolver, H2S scavengers, iron sulfide dissolvers, asphaltene inhibitors/dissolver may be incorporated to the coating material to release upon the breakage of the coating material and help to mitigate scale challenges in the wellbore/reservoir contact area; and chemicals and polymers may be incorporated to alter the wettability of the fracture face to reduce fluid/rock interactions, proppant embedment and fracture closure.

Embodiments of the present disclosure may utilize conventional coating methods, including the following: High sheer granulation and fluid bed granulation, extrusion and spheronization, and wet ball milling; powder coating techniques: thermosets and thermoplastics; electrostatic fluidized bed coating; electrostatic magnetic brush (EMB) coating; agglutination process is proposed to coat different kinds of ceramic particles with various metallic elements; plasma spray coating; detonation gun; oxygen acetylene powder and oxygen acetylene rod; rotating fluidized bed coater; physical vapor deposition (PVD); chemical vapor deposition (CVD); micro-arc oxidation (MAO); sol-gel; and thermal spray Embodiments of the present disclosure are also directed to designing coated proppants with reduced settling velocity in fluids with Reynolds numbers between 2-500. As mentioned above, Equation 1 applies to carrier fluids with Reynolds numbers less than 2 and may not apply to carrier fluids with greater flow Reynolds number. Instead, Equation 10 may be used to calculate settling velocity of a particle in Reynolds numbers between 2-500.

$$v_p = \frac{20.34(\rho_p - \rho_f)^{0.71} d_p^{1.14}}{\rho_f^{0.29} \mu^{0.43}} \quad \text{(Eq. 10)}$$

The ratio of the settling velocity of a coated particle to the settling velocity of the uncoated particle in carrier fluids with greater flow Reynolds number may be evaluated in Equation 11.

$$\frac{v_e}{v_p} = \alpha_r^{1.14} \left( \frac{\rho_e - \rho_f}{\rho_p - \rho_f} \right)^{0.71} \quad \text{(Eq. 11)}$$

Figure 5:
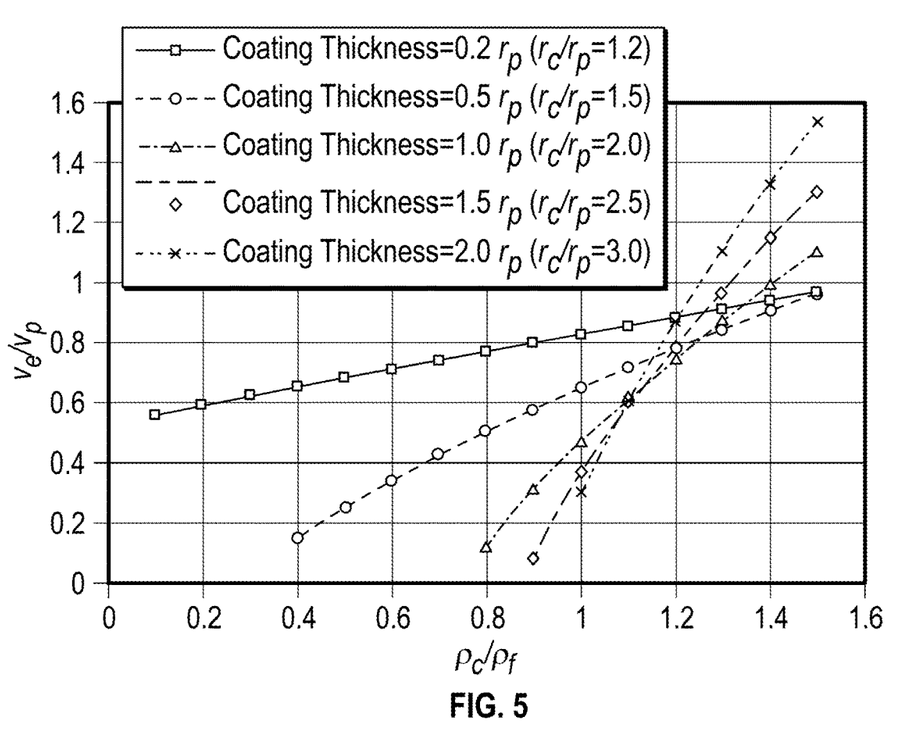
FIG. 5 shows a relationship between the settling velocity and the coating material density for proppant particles in carrier fluids with Reynolds number between 2-500.

FIG. 5 shows the engineering chart for settling velocity relationship with the coating material density as calculated for carrier fluids with Reynolds number between 2-500. The curves shown in FIG. 5 were calculated using Equation 9, Equation 10, and Equation 11. While FIG. 5 shows the calculated curves for coating thickness of 0.2, 0.5, 1.0, 1.5, and 2.0, it will be understood by one skilled in the art with the benefit of the present disclosure that additional curves may be calculated and plotted on FIG. 5 for additional coating thicknesses using the equations of the present disclosure.

One or more embodiments are also directed to designing a coated proppant for carrier fluids having a Reynolds number greater than 500. In embodiments of the present disclosure for carrier fluids with Reynolds number greater than 500, Equation 12 may be used to calculate the settling velocity of the uncoated proppant.

$$v_p = 1.74 \sqrt{\frac{g(\rho_p - \rho_f) d_p}{\rho_f}} \quad \text{(Eq. 12)}$$

Similarly, the ratio of settling velocity of a coated particle to that of uncoated particle may be calculated with Equation 13.

$$\frac{v_e}{v_p} = \alpha_r^{0.5} \left( \frac{\rho_e - \rho_f}{\rho_p - \rho_f} \right)^{0.5} \quad \text{(Eq. 13)}$$

Figure 6:
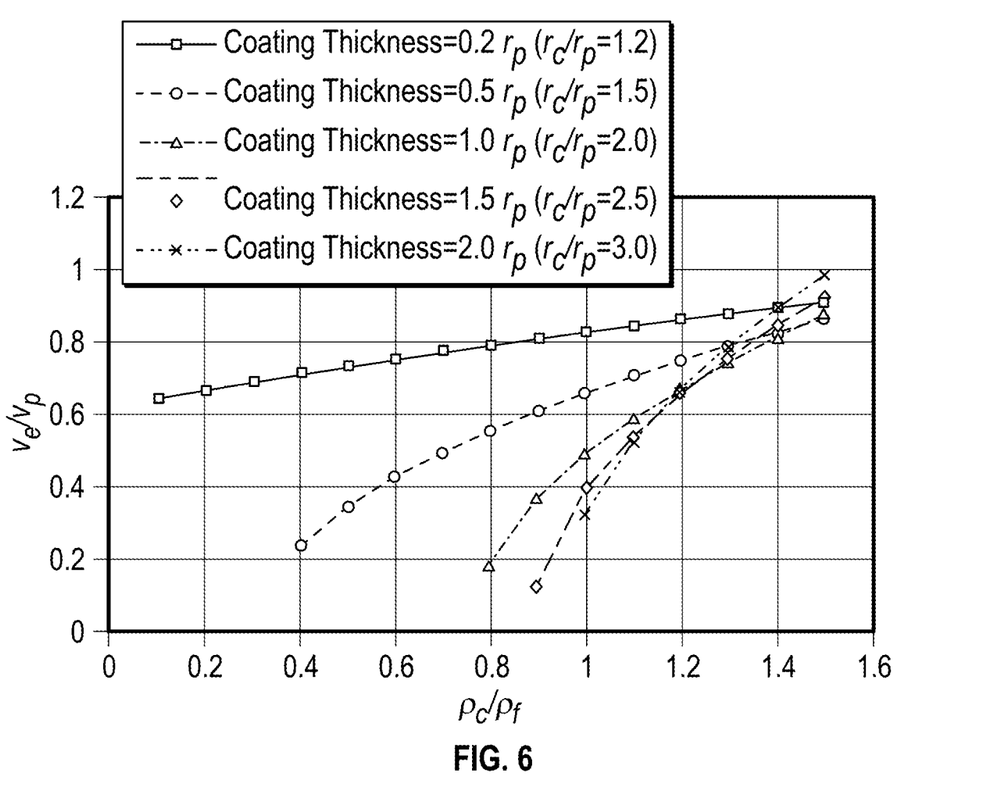
FIG. 6 shows a relationship between the settling velocity and the coating material density for proppant particles in carrier fluids with Reynolds number greater than 500.

FIG. 6 shows the engineering chart for settling velocity relationship with the coating material density as calculated for carrier fluids with Reynolds number above 500. The curves on FIG. 6 were calculated using Equation 9, Equation 12 and Equation 13. While FIG. 6 shows the calculated curves for coating thickness of 0.2, 0.5, 1.0, 1.5, and 2.0, it will be understood by one skilled in the art with the benefit of the present disclosure that additional curves may be calculated and plotted on FIG. 6 for additional coating thicknesses using the equations of the present disclosure. As expected, the engineering charts as shown in FIG. 5 and FIG. 6 for high Reynolds number show some nonlinear effects. To reduce settling velocity by same percentage with same coating thickness, the coating material for proppants in fluid flow with higher Reynolds number needs to be slightly lighter.

Example

The following example illustrates an analysis using an embodiment of the present disclosure.

For an example proppant particle, it has a radius, $r_p$, of 50 μm and a specific gravity, $v_p$, of 2.65, a desired coating thickness of 75 μm, and a target of double the placement distance in a fracture in a carrier fluid with Reynolds number less than 2. The following steps may provide an appropriate coating material density:

Step 1) Determine the settling velocity ratio. In this example, the settling velocity of the uncoated proppant particle ($v_p$) is twice as much as the settling velocity of the coated proppant particle ($v_e$). In other words, $v_p = 2v_e$, giving the settling velocity ratio of $v_e/v_p = 0.5$. Considering a desired coating thickness of 75 μm, the coating thickness ratio, $r_c/r_p$, is 125/50=2.5, thus the coating thickness may be expressed as 1.5 $r_p$.

Step 2) Referring to FIG. 4, the velocity ratio of $v_e/v_p = 0.5$ on the y-axis intersects the coating thickness line (plotted with closed circles) of 1.5 $r_p$ at the specific density ratio of $\rho_c/\rho_f$ of 1.02.

Step 3) The specific density ratio of $\rho_c/\rho_f$ of 1.02 provides the parameters to choose an appropriate coating material with a specific density, $\rho_c$, to be 1.02 $\rho_f$. The material may be selected from a variety conventional coating materials, such as those described above, that meet the specific density requirement.

Embodiments of the present disclosure may provide at least one of the following advantages. Embodiments of the present disclosure may provide design workflow and/or engineering charts based on the target placement distance and/or settling velocity, flow regime, proppant particle and coating material properties.

Although the present disclosure may be in terms of a single coating layer on a proppant, the coated particles and methods of the disclose may be used in designing a proppant with more than one coating layer. Embodiments of the present disclosure may also include voids in the proppant, including voids within the layers disposed on the proppant.

Although the following discussion may be in terms of propped slickwater fracturing treatments, the methods of designing coated particles of the disclosure may be used in gravel packing, acid fracturing, and other oilfield treatments in which materials conventionally called gravel, sand, and proppant are used. The disclosure may be equally applicable to wells of any orientation. The disclosure may be described for hydrocarbon production wells, but it is to be understood that the disclosure may be used for designing proppants for production of other fluids, such as water or carbon dioxide, or, for example, for injection or storage wells.

Although the present disclosure may describe low viscosity carrier fluids, it will be understood by those of ordinary skill in the art that the present disclosure may be applied to other fracturing fluids to reduce the settling velocity of a proppant in the carrier fluid, thereby increasing the transport distance of the proppant.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A process for forming a coated proppant particle for downhole transportation and placement in a carrier fluid, comprising:

selecting a proppant particle material;

selecting a coating material having a density for coating on the proppant particle material;

selecting a target reduction in a settling velocity, wherein the target reduction in settling velocity is a ratio of $$\frac{v_e}{v_p},$$

where $v_e$ is the settling velocity of the coated proppant particle and $v_p$ is the settling velocity of an uncoated proppant particle, and $$\frac{v_e}{v_p} = \alpha_r^2 \frac{(\rho_e - \rho_f)}{(\rho_p - \rho_f)}$$

wherein $$\alpha_r = \frac{r_c}{r_p},$$

where $r_c$ is the radius of the coated proppant particle and $r_p$ is the radius of the uncoated proppant particle, and $\rho_e$ is the density of the coated proppant particles, $\rho_p$ is the density of the uncoated proppant particle, and $\rho_f$ is the density of a carrier fluid, and $$v_e = \frac{g d_c^2 (\rho_e - \rho_f)}{18\mu},$$

wherein $d_c$ is the diameter of the coating material disposed on the proppant particle material and μ is the viscosity of the carrier fluid;

determining a diameter of the coating material disposed on the proppant particle material based on the selected proppant particle material and the density of the coating material to achieve the target reduction in settling velocity; and coating the proppant particle material with the coating material.

2. The process of claim 1, wherein the Reynolds number of the carrier fluid is less than or equal to 2, and wherein the settling velocity of the uncoated proppant particle is:

$$v_p = \frac{gd_p^2(\rho_p - \rho_f)}{18\mu}$$

wherein $d_p$ is the diameter of the uncoated proppant particle.

3. The process of claim 1, wherein the Reynolds number of the carrier fluid is between 2-500, and $$v_p = \frac{20.34(\rho_p - \rho_f)^{0.71}d_p^{1.14}}{\rho_f^{0.29}\mu^{0.43}}$$

wherein $d_p$ is the diameter of the uncoated proppant particle, and $$\frac{v_e}{v_p}$$

becomes $$\frac{v_e}{v_p} = \alpha_r^{1.14}\left(\frac{\rho_e - \rho_f}{\rho_p - \rho_f}\right)^{0.71}.$$

4. The process of claim 1, wherein the Reynolds number of the carrier fluid is greater than 500, and $$v_p = 1.74\sqrt{\frac{g(\rho_p - \rho_f)d_p}{\rho_f}}$$

wherein $d_p$ is the diameter of the uncoated proppant particle, and $$\frac{v_e}{v_p}$$

becomes $$\frac{v_e}{v_p} = \alpha_r^{0.5}\left(\frac{\rho_e - \rho_f}{\rho_p - \rho_f}\right)^{0.5}.$$

5. The process of claim 1, further comprising: pumping the designed coated proppant particles through a wellbore and into a fracture tip.

6. The process of claim 5, further comprising: removing the coat from the designed coated proppant particles.

7. A process for forming a coated proppant particle for downhole transportation and placement in a carrier fluid, comprising:
    selecting a proppant particle material;
    selecting a coating material thickness for coating on the proppant particle material;
    selecting a target reduction in a settling velocity, wherein the target reduction in settling velocity is a ratio of $$\frac{v_e}{v_p},$$

where $v_e$ is the settling velocity of the coated proppant particle and $v_p$ is the settling velocity of an uncoated proppant particle, and $$\frac{v_e}{v_p} = \alpha_r^2\frac{(\rho_e - \rho_f)}{(\rho_p - \rho_f)}$$

wherein $$\alpha_r = \frac{r_c}{r_p},$$

where $r_c$ is the radius of the coated proppant particle and $r_p$ is the radius of the uncoated proppant particle, and $\rho_e$ is the density of the coated proppant particles, $\rho_p$ is the density of the uncoated proppant particle, and $\rho_f$ is the density of a carrier fluid, and $$v_g = \frac{gd_c^2(\rho_e - \rho_f)}{18\mu},$$

wherein $d_c$ is the diameter of the coating material disposed on the proppant particle material and $\mu$ is the viscosity of the carrier fluid;
    determining a coating material and density for coating on the proppant particle with the coating material thickness based on the selected proppant particle material and the thickness of the coating material to achieve the target reduction in settling velocity; and
    coating the proppant particle material with the coating material.

8. The process of claim 7, wherein the Reynolds number of the carrier fluid is less than or equal to 2, and wherein the settling velocity of the uncoated proppant particle is:

$$v_p = \frac{gd_p^2(\rho_p - \rho_f)}{18\mu}$$

wherein $d_p$ is the diameter of the uncoated proppant particle.

9. The process of claim 7, wherein the Reynolds number of the carrier fluid is between 2-500, and $$v_p = \frac{20.34(\rho_p - \rho_f)^{0.71}d_p^{1.14}}{\rho_f^{0.29}\mu^{0.43}}$$

wherein $d_p$ is the diameter of the uncoated proppant particle, and $$\frac{v_e}{v_p}$$

becomes $$\frac{v_e}{v_p} = \alpha_r^{1.14}\left(\frac{\rho_e - \rho_f}{\rho_p - \rho_f}\right)^{0.71}.$$

10. The process of claim 7, wherein the Reynolds number of the carrier fluid is greater than 500, and $$v_p = 1.74\sqrt{\frac{g(\rho_p - \rho_f)d_p}{\rho_f}}$$

wherein $d_p$ is the diameter of the uncoated proppant particle, and $$\frac{v_e}{v_p}$$

becomes $$\frac{v_e}{v_p} = \alpha_r^{0.5}\left(\frac{\rho_e - \rho_f}{\rho_p - \rho_f}\right)^{0.5}.$$

11. The process of claim 7, further comprising: pumping the designed coated proppant particles through a wellbore and into a fracture tip.

12. The process of claim 11, further comprising: removing the coat from the designed coated proppant particles.

\* \* \* \* \*